(No Model.)
E. MOORE.
FISHING REEL.
No. 602,585.  Patented Apr. 19, 1898.
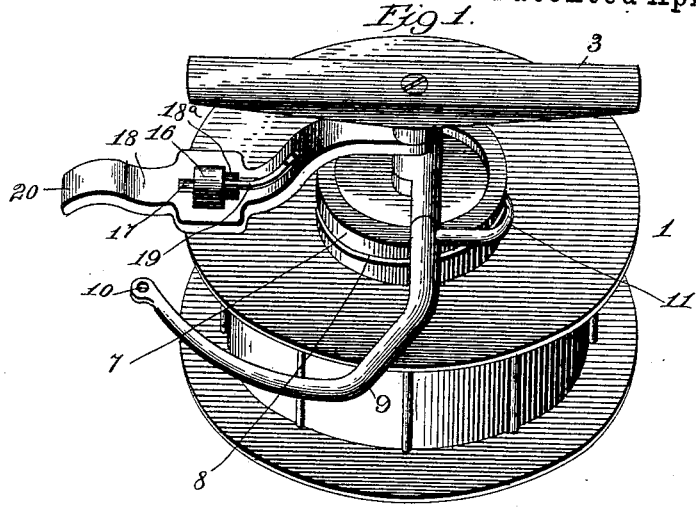
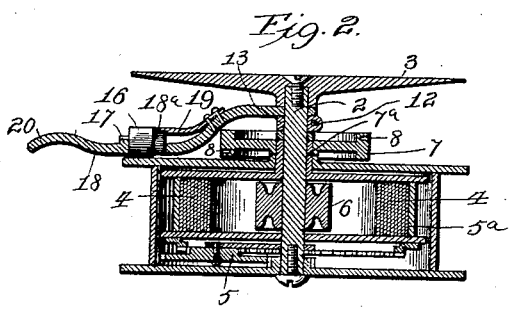
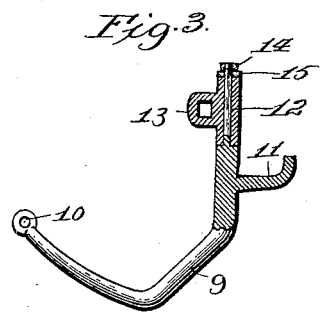
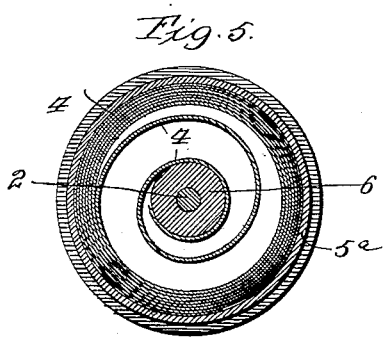
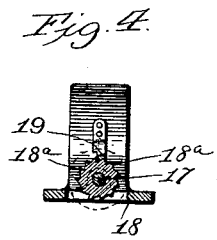
Witnesses
Herbert Bradley
Karl H. Fleming
Inventor
Elisha Moore
By Knight Bros
Attorneys
THE NORRIS PETERS CO., PHOTO-LITHO., WASHINGTON, D. C.

UNITED STATES PATENT OFFICE.

ELISHA MOORE, OF MEDUCTIC, CANADA.

FISHING-REEL.

SPECIFICATION forming part of Letters Patent No. 602,585, dated April 19, 1898.

Application filed January 21, 1897. Serial No. 620,146. (No model.)

*To all whom it may concern:*

Be it known that I, ELISHA MOORE, a subject of the Queen of Great Britain, residing at Meductic, in the county of York and Province of New Brunswick, Canada, have invented certain new and useful Improvements in Fishing-Reels, of which the following is a specification.

My present invention relates more particularly to that class of reels known as "automatic" reels, in which the cord is wound upon a reel by means of a coiled spring under the control of a brake; and the present improvements especially relate to the spring for winding the reel and brake, and also to a means for guiding the cord as it is wound upon the reel, as will be hereinafter more fully described, and pointed out in the claims.

In order that my invention may be fully understood, I will proceed to describe the same with reference to the accompanying drawings, in which—

Figure 1 is a perspective view of a fishing-reel having my improvements applied thereto. Fig. 2 is an axial section. Fig. 3 is a detail view, partly in section, of the device for guiding the cord onto the reel. Fig. 4 is a detail view of the brake mechanism, and Fig. 5 is a section showing the manner of securing the spring in the spring-case.

In the said drawings, 1 represents the reel, 2 the shaft, and 3 the plate by which the device is secured to the rod and to which the shaft is rigidly secured. The reel, it will be seen, is mounted to turn on its sleeve $7^a$ at one end and on the shaft at the other, and rotary motion is given to it by means of the spring 4 through the mechanism 5, which is the same as ordinarily used in reels of this class. The spring 4 has preferably very little bend in it (see Fig. 5)—that is to say, it is only bent where it is connected with the drum 6, which is rigidly secured upon the shaft 2. By this arrangement I am enabled to place the spring close to the periphery of the case $5^a$, as shown, so that when the spring is wound as the line is played out there is only a small portion brought into action at each turn of the reel, and when the spring unwinds the power is a little less at the last turn than when fully wound. This is due to the fact that the tension exerted in winding is spread only over a few inches rather than over the whole length of spring, which is the case in the ordinary reels.

7 represents a drum rigidly secured on the sleeve $7^a$ of the spring-case $5^a$, so as to turn with it, and the drum is provided with a cam-groove 8, which is arranged in a diagonal direction around the drum. This drum and groove are adapted to operate the guide for the line, which travels back and forth between the sides of the reel, so as to guide the line evenly on the reel, and thus prevent snarling and tangling. The guide consists of the arm 9, which is bent to throw it into position over the reel, the eye 10, through which the line passes, and the integral short arm or projection, which fits into the cam-groove in the drum 7. A reduced portion 12 of the arm 9 fits in a casting 13, which is fixed on the shaft in the position shown in Fig. 2, and the portion 12 is arranged to turn in said casting as the cam-groove swings the arm 11 from side to side.

14 and 15 represent a nut and washer for holding the arm in the casting.

The brake consists of the friction-roller 16, journaled at 17 in an opening in the arm 18, which is carried by the shaft 2. The roller has a reduced portion on which ratchet-teeth $18^a$ are provided, and 19 represents a spring for engaging the teeth and in this manner preventing the roller turning in the winding direction of the reel. The arm 18 is sufficiently flexible to be moved away from the reel, so as to allow the spring to turn the reel, and it is provided with the finger-hold 20, by which it is moved. The advantage of this arrangement with the brake will be readily understood, especially when trolling with the rod attached to the boat or when fishing with the rod out of hand, in that the brake will allow the reel to run out the line without any resistance, but will not permit the line to be wound, whereas in the forms of brakes ordinarily used the brake is so stiff that it will not let the reel run out easily because of its having to be stiff enough to prevent the spring winding.

The advantage of the guide will also be seen. With the guide it makes no difference in what position the reel is placed to wind the cord, for the reason that the guide moves back and forth across the reel, thereby preventing any tangling, and also, owing to the cord being evenly wound, it can be run out more easily.

Having thus described my invention, what I claim as new therein, and desire to secure by Letters Patent, is—

1. In a fishing-reel, the combination with the spring-case, a sleeve integral with the same, of a drum provided with a cam-groove and rigidly secured to said sleeve, a swinging guide, and an arm integral with and extending from said guide adapted to engage said groove; substantially as described.

2. In a fishing-reel, the combination of the reel, the spring-case and automatic means for winding the reel, a drum carried by the spring-case provided with a suitable cam-groove, and a swinging guide on said reel having an arm in engagement with said groove, substantially as shown and described.

3. In a fishing-reel, the winding-reel, means for winding the same, a brake for said reel comprising a fixed flexible arm, a roller journaled in said arm and bearing on the reel, and means controlling said roller in one direction only, substantially as described.

4. In a fishing-reel, the combination of the reel, means for winding the same, and a brake for said reel consisting of a flexible arm, a roller journaled in said arm and bearing against said reel, ratchet-teeth provided on the roller, and a spring engaging the said ratchet-teeth, substantially as shown and described.

ELISHA MOORE.

Witnesses:
JOSIAH R. MURPHY,
HUGH MONTGOMERY.